Nov. 25, 1969  A. S. TOPOLSKI ET AL  3,480,189
FRACTURING OF SOLID BODIES
Filed Jan. 9, 1967  2 Sheets-Sheet 1

INVENTORS.
Alvin S. Topolski
BY Walter A. Trumbull

AGENT

Nov. 25, 1969  A. S. TOPOLSKI ET AL  3,480,189
FRACTURING OF SOLID BODIES

Filed Jan. 9, 1967  2 Sheets-Sheet 2

INVENTORS.
Alvin S. Topolski
BY Walter A. Trumbull

AGENT

United States Patent Office 3,480,189
Patented Nov. 25, 1969

3,480,189
FRACTURING OF SOLID BODIES
Alvin S. Topolski and Walter A. Trumbull, Midland, Mich., assignors to The Dow Chemical Company, Midland, Mich., a corporation of Delaware
Continuation-in-part of application Ser. No. 526,492, Feb. 10, 1966. This application Jan. 9, 1967, Ser. No. 613,714
Int. Cl. B26f 3/00, 3/02; B65h 35/00
U.S. Cl. 225—4        12 Claims

ABSTRACT OF THE DISCLOSURE

Rigid strands are formed into granules by passing the strands between rotating toothed gear-like drums between which the strand is flexed and fractured to provide uniform or non-uniform sized granules, as desired. The granules produced from plastic materials exhibit a clean fracture and a low tendency toward dusting.

---

This application is a continuation-in-part of U.S. patent application Ser. No. 526,492, filed Feb. 10, 1966, now abandoned.

This invention relates to the fracturing of solid bodies, and more particularly relates to a method and apparatus for fracturing of solid bodies by flexing thereof.

Oftentimes it is desirable to fracture solid bodies such as strands of synthetic resinous thermoplastic material, thermosetting resins and the like into pellets or granules. Oftentimes this is accomplished by employing a hammermill, by extruding a plurality of filaments or strands and cutting the strands adjacent a die face while the strands are in a heat plastified condition or at least at a temperature above their second order transition point or glass temperature. Alternately, strands are cooled below their second order transition point or glass temperature and fed into a rotating cutter which is rotating at a high rate of speed and the strands fragmented by means of impact with the blades thereof. Oftentimes in the preparation of granular synthetic resinous material, it is desirable to produce granules having a generally cylindrical form. It is also usually desirable that such granules be solid and of generally uniform particle size. Frequently, in the preparation of such granules, undesired fragmentation occurs resulting in particles having a size considerably below the desired particle dimensions. Such small particles are frequently referred to as "fines." In certain processes such as the molding of thermoplastic resinous materials such as alkenyl aromatic resins, fines or undersize particles present a health hazard in that they may be carried through the air during the handling operations in a manner not desired and inhaled by operating personnel. Such fines often give rise to undesirable characteristics such as silver streaking in an injection molding operation. Silver streaking is a phenomenon which occurs in a molded piece and has the general appearance of fine silvery lines disposed within the molded article or on the surface thereof. Fines are extremely undesirable wherein a dry blend of a resin is prepared with a pigment or a color concentrate. The small particles tend to stratify and cause a non-uniform dispersion of the pigment within the particulate mass. The non-uniformity oftentimes becomes painfully apparent on heat fabrication of the particles such as by injection molding. The presence of such fines in a granular or particulate resinous mix frequently requires that the granules be subjected to a screening operation in order to remove the fine particles. Some foamable or expandable synthetic resinous materials are prepared in granular form and it is particularly desirable that such foamable particles be of relatively uniform size in order that uniform foaming or expansion occurs and the resultant fabricated part or foamed body prepared by the molding of such granules will have a uniform density throughout. The presence of fines in a foamable particulate mass generally gives rise to stratification and many of the small particles either do not expand or expand to a lesser degree than do the larger particles. The presence of the fine particles within a mass of plastic granules can give rise to considerable difficulty in the bulk shipment thereof, that is, shipment of granules in relatively large containers. During shipment, vibration and motion causes the larger particles and smaller particles to become separated and require a screening or blending operation before the material is suitable for use. Oftentimes in the preparation of granules from strands by an impact method such as an impact mill or grinder, particles of satisfactory size are formed, together with some fines which may be separated by a screening operation. However, the granules prepared in this manner often show a plurality of cracks or fractures at either end of the granule which, on shipping and handling, further fragment to provide more fines. Such granules are extremely undesirable and particularly undesirable in applications where the granules are being conveyed by a pneumatic conveyor and are subject to impact with each other and collision with the walls of the conveyor system. The presence of fractures increases the surface area of the granules and therefore increases the amount of water which can be held by a given weight of material.

It would be extremely desirable if there were available a method and apparatus for the preparation of granular material from a strand which would result in a relatively uniform particle with a minimum quantity of particles outside of the desired size range.

It would also be desirable if there were available a method and apparatus for the preparation of particles of synthetic resinous granular material which would result in a minimal heat history of the material.

It would also be beneficial if there were available a method and apparatus for the formation of granules of synthetic resinous material which would provide particles with a very low proportion of fractures therein.

It would also be desirable if there were available a method and apparatus for the preparation of granular plastic materials which have relatively low power requirements and low cost.

It would be advantageous if there were available a method and apparatus for the preparation of granular thermoplastic resinous materials from a strand which would minimize wear on a feeding means to such an apparatus.

It would be further advantageous if a method and apparatus for granulating strandular materials were available which had a relatively high capacity, occupied a relatively small space and operated at relatively low noise level.

These benefits and other advantages in accordance with the present invention are achieved in a method for the transformation of a strandular brittle material into a plurality of elongated granules which comprise continuously passing at least one strand of a fracturable material between a pair of spaced apart configurations, the configurations defining a plurality of spaced apart pressure points, the pressure points on the opposed configurations being alternately arranged, applying pressure to the strands at locations on opposite sides of the strand by the opposed configurations, the pressure and rate of application of the pressure being sufficient to cause rupture of the strands to form particles from the strand.

Also contemplated within the scope of the present invention is an apparatus for fracturing a strandular brittle material to form a plurality of granules, the apparatus comprising in cooperative combination first and second toothed rotary elements, each of the toothed rotary elements having a plurality of spaced apart teeth externally disposed thereon, the teeth of the first and second rotary elements being in spaced adjacent, non-contacting relationship, and the teeth of each of the rotary elements alternating with the teeth of the opposed rotary element, the rotary elements being spaced apart a distance sufficient to pass a strand therebetween and exert pressure on the strand to cause fracture thereof into granules.

Further features and advantages of the present invention will become more apparent from the following specification when taken in connection with the drawing wherein:

In FIGURE 1 there is schematically represented an apparatus in accordance with the invention.

FIGURE 2 schematically illustrates the rupture of strands or sheets in accordance with the invention.

Figure 1:
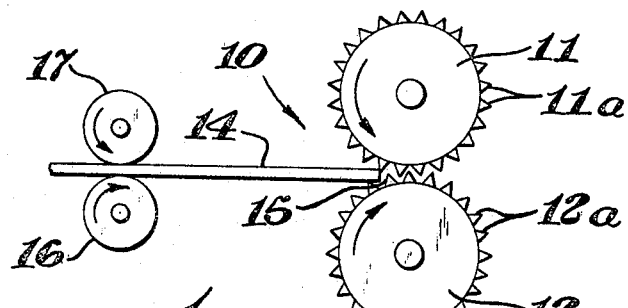

In FIGURE 1 there is schematically illustrated an apparatus for the fracturing of brittle strands generally designated by the reference numeral 10. The apparatus 10 comprises in cooperative combination a first toothed rotary element 11 and a second tooth rotary element 12. The toothed rotary elements each have the same pitch and rotate in a direction as indicated by the arrows. The rotary element 11 has disposed thereon a plurality of teeth 11a. The rotary element 12 has a plurality of teeth 12a. The teeth 11a and 12a are generally peripherally disposed in the rotary elements 11 and 12 and are disposed in adjacent spaced relationship wherein the teeth 11a of the element 11 and the teeth 12a of the element 12 intermesh but do not contact each other. The rotary elements 11 and 12 are maintained in synchronized rotary motion as designated by the arrows. A brittle element such as a sheet or strand 14 is shown entering a nip 15 generally defined by the rotary elements 11 and 12. The strand 14 is supported and fed to the rotary elements 11 and 12 by means of a pair of nip rolls 16 and 17. The alternately disposed teeth 11a and 12a within the nip 15 cause pressure to be applied to the strand or sheet and cause it to fracture into a plurality of particles.

Figure 2:
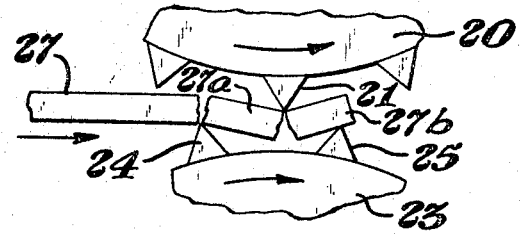

In FIGURE 2 there is schematically illustrated a fractional view of the action occurring in an apparatus such as the apparatus 10 of FIGURE 1. A first toothed element 20 has disposed thereon a tooth 21. Opposite the element 20 is a second toothed element 23 having disposed peripherally thereon teeth 24 and 25. A strand 27 is forwarded toward the teeth 24 and 21 in a direction indicated by the arrow. The toothed elements 20 and 23 are rotated in a direction indicated by the arrow. As the strand passes between the toothed elements, it is supported at two points by the teeth 24 and 25 and at a location intermediate between these support points and at a location of the open side of the strand or sheet the tooth 21 applies pressure thereto causing the strand 27 to rupture into two particles 27a and 27b. As the elements 20 and 23 continue to rotate and the strand 27 advances, the strand would be supported by two teeth on the element 20 and contacted by a single tooth on the element 23.

The fracturing action occurring in FIGURE 2 provides granules having a length of one-half L, wherein L is the dimension of the spacing of the pressure points on one of the configurations.

Figure 3:
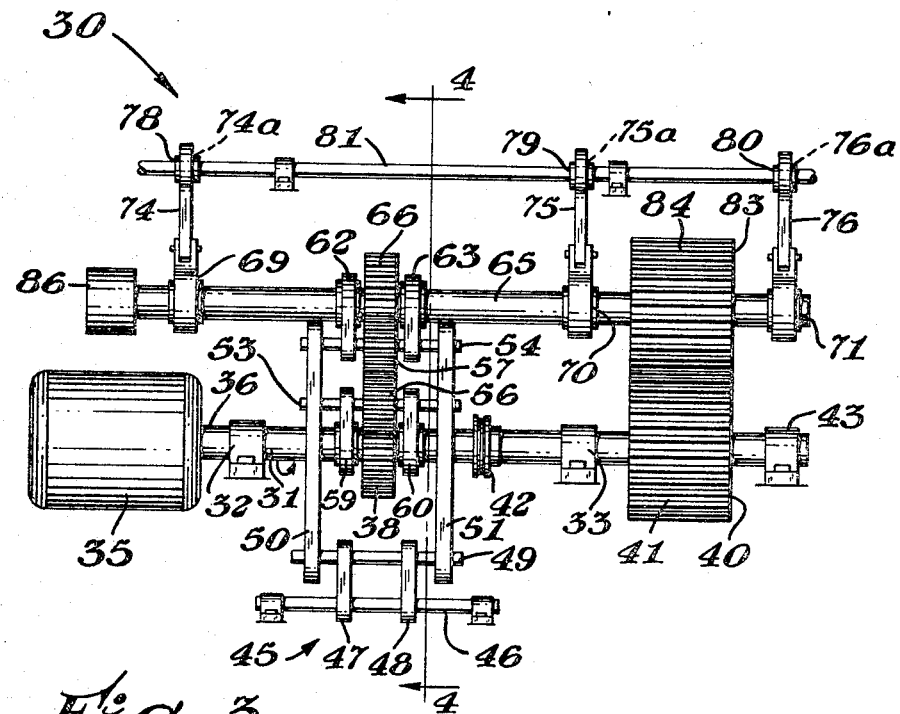
FIGURE 3 is a schematic view of the operating elements of a strand fracturing apparatus in accordance with the invention.

In FIGURE 3 there is illustrated a schematic representation of one embodiment of the invention generally designated by the reference numeral 30. The apparatus 30 is schematic in nature and supports or framing are not shown for the sake of clarity. The apparatus 30 comprises in cooperative combination a driven shaft 31 which is supported by a pair of fixed or frame supported bearings 32 and 33. The shaft 31 is rotated at the direction indicated by the arrow. A motor or drive means 35 is in operative communication with a first end 36 of the shaft 31. A first synchronizing or drive gear 38 is rigidly affixed to the shaft 31 and disposed between the bearings 32 and 33. A toothed rotary element or fracturing gear 40 is rigidly affixed to the shaft 31 generally adjacent the bearing 33 and remote from the bearing 32. A third fixed or frame supported bearing 43 supports the shaft 31 adjacent the roll 40 and remote from the bearing 33. The roll or fracturing gear 40 has a plurality of spaced apart teeth 41 disposed thereon. A drive means 42 is rigidly affixed to the shaft 31 and adapted to be in operative communication with a variable speed drive for feed rolls (not shown) such as the rolls 16 of FIGURE 1. A synchronizing gear support mechanism generally designated by the reference numeral 45 is disposed generally adjacent to the gear 38. The synchronizing gear support mechanism comprises in cooperative combination a fixed shaft or pivot 45 having pivotally affixed thereto a first arm 47 and a second arm 48. The arms 47 and 48 pivotally engage a shaft 49 which is disposed parallel to the shaft 46. The arms 47 and 48 are also pivotally attached to the shaft 49 in such a manner that the shaft 49 can rotate in an arc of a circle about the fixed shaft 46. The shaft 49 is affixed to a first idler gear support arm 50 and a second idler gear support arm 51. The idler gear support arms 50 and 51 are in spaced apart relationship and are disposed generally on either side of the drive gear 38. The idler gear support arms 50 and 51 carry a first idler gear support shaft 53 and a second idler gear support shaft 54. The shafts 31, 43, 46, 49, 53 and 54 are in parallel relationship to each other. The first idler gear support shaft 53 supports rotatably a first idler gear 56. The second idler gear shaft 54 rotatably supports a second idler gear 57. The first and second idler gears are in operative engagement with each other and the first idler gear 56 engages the drive gear 38. The first idler gear shaft 53 is in operative engagement with a first idler gear support arm or link 59 and a second idler gear link or support arm 60. The idler gear arms 59 and 60 are in operative engagement with the drive shaft 31 and maintain the first idler gear shaft 53 in spaced relationship thereto. The distance between centers on the drive shaft 31 and first idler gear shaft 53 is identical to the distance between centers of the shafts 49 and 46. The second idler gear support shaft 54 carries second idler gear spacing arms 62 and 63. The arms 62 and 63 remote from the second idler gear shaft 54 are in operative engagement with a movable drive shaft 65. The shaft 65 is rotatably journaled within the arm 62 and 63. The distance between center of the shaft 65 and the center of the shaft 54 is equal to the distance between centers of the shafs 53 and 31. Rigidly affixed to the movable drive shaft 65 is a second synchronizing gear 66. The synchronizing gear 66 is in operative engagement with the idler gear 57. The movable driving shaft 65 is rotatably supported by first, second and third adjustable bearings 69, 70 and 71 corresponding generally in location to the bearings 32, 33 and 43. The bearings 69, 70 and 71 are adjustably mounted in such a manner that they may be moved toward or away from the fixed driving shaft 31 along a line passing through shafts 31, 46 and 65. The bearings 69, 70 and 71 have affixed thereto pivotally mounted connecting rods 74, 75 and 76, respectively. The connecting rods 74, 75 and 76 each define a generally cylindrical opening 74a, 75a and 76a remotely disposed from the bearings 69, 70 and 71 respectively. The generally circular openings 74a, 75a and 76a operatively engage cylindrical cams 78, 79 and 80, respectively. The cams 78, 79 and 80 are rigidly affixed to a cam shaft or adjusting means 81. A second rotary toothed element or fracturing means 83 is rigidly affixed to the movable driving shaft 65 and disposed adjacent the gear 40. The fracturing means 83 has a plurality of teeth 84 defined on a generally cylindrical external surface thereof. A braking means 86 is affixed to the shaft 65 and adapted to restrain rotation thereof and function as an anti-backlash device.

Figure 4:
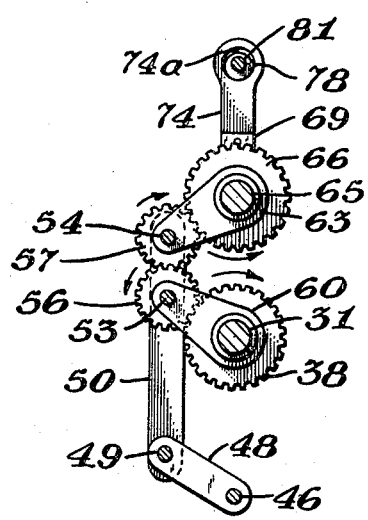
FIGURE 4 is a view of the apparatus of FIGURE 3 taken along the line 4—4.

In FIGURE 4 there is schematically illustrated a view of the synchronizing gear support frame and associated parts taken along the line 4—4 of FIGURE 3 wherein the motor 35 has been omitted. The arms 47 and 48 are affixed to the shaft 46 and the idler gear support 51 by means of the shaft 49. The first idler gear support shaft 53 is connected to the drive shaft 31 by means of the arms 59 and 60. The shaft 31 and the shaft 46 are in fixed parallel relationship to each other. A point on the arms 51 and 50 can move in an arc of a circle determined by the distance between centers of the shafts 46 and 49 and the shafts 53 and 31. Rotation of the shaft or actuating means 81 causes the cam 78 to raise or lower the connecting rod 74 which in turn raises or lowers the shaft 65 and in effect brings the fracturing means 40 and 83 into closer relationship or spaces them further apart, depending upon the desired spacing for the particular variety of material being cut.

In operation of the apparatus as depicted in FIGURES 3 and 4, power is applied to the shaft 31 causing it to rotate in the direction indicated by the arrow. The synchronizing gear 38 drives the idler gears 56 and 57 which in turn drive the second synchronizing gear 66 and causes rotation of the shaft 65. The braking means 86 provides a drag and eliminates backlash when spur gears are employed in the synchronizing assembly and fracturing is obtained in the manner of FIGURE 1. If desired, such a backlash may be eliminated by other means well known to the art such as anti-backlash gears, timing belts and the like. If desired, direct mechanical coupling of the shafts 31 and 65 may be eliminated by an electrical coupling such as the use of a synchro or selsyn motor having sufficient torque to prevent the teeth such as the teeth 84 and 41 from being angularly displaced. Generally for economic reasons, it is desirable usually to employ mechanical synchronization.

Figure 5:
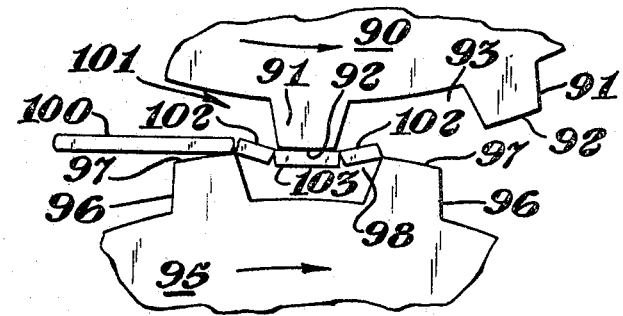
FIGURE 5 depicts an alternate tooth configuration for an apparatus in accordance with the present invention.

In FIGURE 5 there is schematically illustrated an alternate arrangement which may be employed with benefit in the practice of the present invention. A fractional view is shown of a pair of opposed rotary elements. A first rotary toothed element 90 has a plurality of teeth 91 disposed thereon. The teeth 91 terminate in a flat or generally cylindrical surface 92. A space 93 is defined between the teeth 91 and 92 which is less than three times the length of the flat or cylindrical portion 92 of the tooth 91. A matching, toothed rotary element 95 is disposed adjacent the rotary element 91. The rotary element 95 has teeth 96 having a flat terminal surface 97 or alternately curved configuration generally equal to the external diameter. A space 98 is defined between the adjacent teeth 96 which has a length less than three times the length of flat or curved portion 97 of the teeth 96. A strand 100 is depicted feeding into a nip 101 defined by the adjacent rotary elements. The strand 100 is fractured into portions or granules 102 which are disposed between the adjacent teeth 91 and 96 and a granule or particle 103 which is adjacent the face 92 of the tooth 91. Similar fracturing action occurs as the strand is forwarded into the nip on rotation of the rotary elements in the direction indicated by the arrows.

Figure 6:
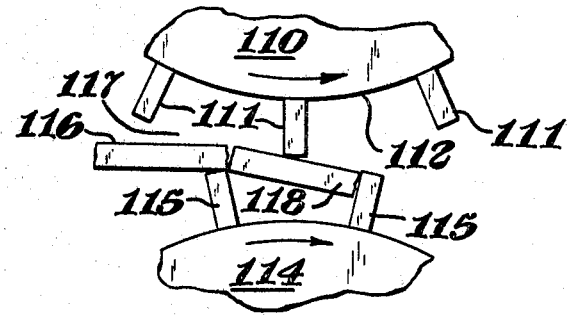
FIGURE 6 depicts an alternate manner of fracturing of a strand.

FIGURE 6 depicts an alternative manner of fracturing a strand in accordance with the method of the present invention. In FIGURE 6 there is depicted a first roll having a plurality of spaced apart "square" or buttress teeth 111 disposed on an outer surface 112 of the roll 110. A similar roll 114 is spaced from the roll 110. The roll 114 has a plurality of teeth 115 having spacing similar to the spacing of the teeth 111 of the roll 110. A strand 116 is shown entering a nip region 117 formed by the rolls 110 and 114. The strand 116 is fractured into granules such as the granule 118 which has a length generally equal to the spacing between the teeth of one roll.

The mode of operation depicted in FIGURE 6 requires particle clearance in the space between the teeth which permits the particle to be depressed into the space therebetween. This mode of operation is particularly desirable when granules are being prepared from relatively small strands. The size of the resultant granule is dependent only upon the spacing between the teeth on the rolls, and substantial variation in the synchronization can be tolerated without providing granules of different sizes; that is, a tooth such as a tooth 111 may be positioned with considerable angular tolerance between the teeth such as the teeth 115 without altering the granule size. This is not the case in the embodiments depicted in FIGURES 2 and 5. The mode of operation set forth in FIGURE 6 generally requires support of the strand such as the strand 116 at a point prior to entering the nip. Such support can be provided by guides not shown, or alternatively, by the mass of the fiber itself; that is, if the rate of travel of the strand into the nip is sufficiently great, the inertia of the strand is sufficient to restrain the strand from significant movement from a plane generally tangent to the rolls at the nip.

Thus, depending on the particular tooth configuration and strand stiffness, the resultant granule may have a length of one, one half or one third the distance between adjacent teeth of the opposed rotating configuration.

In general, the present invention may be practiced employing brittle materials of a wide variety and can be employed to pelletize or fracture such diverse materials as high carbon (1 percent or more) steel wire, tungsten rod, plastic materials in strandular or sheet form. For any particular material, there is usually an optimum operating condition which in particular represents a combination of the temperature of the material being fed and the rate at which stress is applied thereto. In the area of synthetic resins particularly those of the thermoplastic variety, it is usually desirable to operate at a temperature at least about 5° C. below the glass temperature or the second order transition point. Many synthetic resinous materials which are generically referred to as a polymer of a given monomer are formulated during the polymerization or extrusion with minor quantities of additives such as lubricants, stabilizers, pigments, plasticizers and the like. The precise operating conditions are readily determined by cooling or warming a strand or sheet to various temperatures and applying loading to opposite sides of the strand from points spaced a sufficient distance apart to provide a granule of the desired length until conditions are found which result in a clean fracture. Usually, clean fractures are obtained over a relatively wide range of conditions; for example, polystyrene is fractured in accordance with the method and apparatus of the present invention at temperatures which are 5° C. or less than the second order transition point to room temperature and below and over a wide range of feed rates varying from a few feet per minute to several hundred feet per minute. Softer materials such as polyethylenes must be cooled to a temperature well below room temperature in order to provide the adequate brittle characteristics.

In fracturing copolymers of various materials, it is found that optimum temperature and rate conditions are also readily determined. Usually, desirable pellets are obtained from strands of polymeric materials when the materials are fractured at a temperature of from about 5 to about 40° C. below the second order transition point. If the temperature of a thermoplastic material is too high, a crimped strand results wherein the strand is deformed by the teeth rather than fractured. As the temperature is gradually lowered, fractures appear but do not propogate entirely through the strand. As the temperature is lowered still further into the desirable range, complete fracture is obtained wherein the terminal portions of the pellet appear to be broken along a single line and multiple fracture of the end portions is almost entirely absent.

By way of further illustration, an apparatus generally in accordance with that depicted in FIGURES 2 and 3 is prepared wherein the toothed rotary elements have a pitch diameter of about 3.83 inches and a plurality of V-shaped teeth were disposed on the generally cylindrical surface each 8°22′20″ apart. The teeth had a height, that is, from root to peak, of 0.210 inch and the terminal portion of the tooth had a flat portion of about 0.040 inch. A plurality of strands of polystyrene are prepared by extrusion from a hot melt extruder. The strands have a diameter of about 0.090 inch. The rotary elements were spaced in such a manner that the terminal portions of the teeth of the opposed rotary elements are spaced apart distances from 0.000 to 0.010 inch. The rolls are rotated at a speed of 110 revolutions per minute. The polystyrene strands are passed through a 10 foot long water bath having a temperature of 60° F. and through a pair of feed rolls similar to those depicted in FIGURE 1 at a rate of about 100 feet per minute and 180 pounds per hour. The resulting pellets have an average length of about 0.14 inch and show exceptional uniformity. The pellets are placed in a container and subsequently screened to remove fine particles. Screening indicated that fine particles are substantially absent. Microscopic examination of the particles indicated that the terminal portions show a clean break without fragmentation or secondary fractures. Shipping of such particles and handling by conventional pneumatic conveying means indicated little or no tendency of the particles to fracture and produce the fines. Portions of the resin are dry blended with a white pigment (color Index Number GB4894) and subsequently injection molded. Superior color uniformity is obtained when compared with particles prepared by conventional grinding techniques and subsequent screening.

Granular material taken directly from the fracturing apparatus of the present invention indicates substantially fewer fines than carefully screened material taken from the conventional impact fracturing apparatus.

In a manner generally similar to the preceding illustration, a copolymer of 73 percent styrene and 27 percent acrylonitrile, percentages being weight percentages, is processed by extruding strands having a diameter of approximately 0.080 inch and passing at a rate of about 225 feet per minute through a 20 foot long water bath having a temperature of 94° C. The strand entered the rotating toothed elements at a temperature of about 88° C. and is pelletized at a rate of about 150 pounds per hur. The crimping rolls have a diameter of about 3.83 inches. The spacing between the teeth as measured by a radial angle is 8°22′22″. A total height of the tooth, that is, from peak to root, is 0.308 inch. The tooth terminates in a flat surface of 0.025 inch in width. The average pellet length produced is 0.014 inch. The clearance between the tip of the first roll and the root of the second roll was about 0.250 inch. Beneficially, clean fractures are obtained with no evidence of significant secondary fractures or evidence of more than a barely detectable quantity of fines in contrast to about 3 weight percent of fines often obtained by impact grinding.

Often, it is desirable to employ a flat surface on a terminal portion of the tooth which is from about 25 to 100 percent of the diameter of the strand. Such a configuration permits relatively soft materials to be employed in the fabrication of the rotary elements such as aluminum, synthetic resins and the like.

Typically, excellent pelletizing is obtained when expandable polystyrene strands having a diameter of 0.090 inch are employed with a gear 3.83 inches in diameter having 43 teeth, each tooth having a flat surface of 0.040 inch. Excellent granulation is also obtained when polystyrene strands of 0.015 inch in diameter to about 0.040 inch in diameter are utilized with teeth having a flat portion which is about 0.015 inch. Draw or feed rolls are found unnecessary.

In a manner similar to the foregoing illustration, other resinous materials are readily pelletized in accordance with a method and apparatus of the present invention. Such materials are polymethyl methacrylate, polyethylacrylate, saran polymers such as a copolymer of 85 weight percent vinylidene chloride with 15 weight percent vinyl chloride, nylon 66, nylon 6, polypropylene, polycarbonate and the like.

In all cases, the present invention provides operation at relatively low noise levels when compared to impact grinding.

As is apparent from the foregoing specification, the present invention is susceptible of being embodied with various alterations and modifications which may differ particularly from those that have been described in the preceding specification and description. For this reason, it is to be fully understood that all of the foregoing is intended merely to be illustrative and is not to be construed or interpreted as being restrictive or otherwise limiting of the present invention excepting as it is set forth and defined in the hereto appended claims.

What is claimed is:

1. A method for the transformation of a solid strand of synthetic resinous brittle material into a plurality of elongated generally uniform sized granules which comprises:

continuously passing at least one strand of a fracturable material between a pair of spaced apart configurations, the configurations defining a plurality of spaced apart pressure points, the pressure points on the opposed configurations being alternately arranged, applying pressure to locations on opposite sides of the strand by the opposed configurations, the pressure and rate of application of the pressure being sufficient to cause rupture of the strand to form generally uniform sized granules from the strand.

2. The method of claim 1 wherein the material to be fractured is maintained at a temperature of at least 5° C. below its second order transition temperature.

3. The method of claim 1 wherein a plurality of pressure points contact the strand and draw the strand between the configurations.

4. The method of claim 1 wherein the configurations are rotary configurations rotating about generally parallel axes and having pressure points on the outer surface thereof, each of the pressure points engaging the strand terminating in a flat face generally parallel to the strand.

5. The method of claim 1 including the step of feeding a plurality of strands to the configurations.

6. A method for the transformation of a solid strand of synthetic resinous brittle material into a plurality of elongated generally uniform sized granules which comprises:

continuously passing at least one strand of a fracturable material between a pair of spaced apart configurations, the configurations defining a plurality of spaced apart pressure points, the pressure points on the opposed configurations being alternately arranged, applying pressure to at least two points on one side of the strand by one configuration and at one point on the opposite side of the strand by the opposite configuration at a location between the two points, the pressure and rate of application of the pressure being sufficient to cause rupture of the strand and form at least two granules having a combined length L wherein L is a dimension of the spacing of the pressure point on one of the configurations.

7. An apparatus for fracturing of a strandular brittle material to form a plurality of granules, the apparatus comprising in cooperative combination:
  first and second rotary toothed elements, each of the toothed rotary elements having a plurality of spaced apart teeth externally and longitudinally disposed thereon, the teeth of the first and second rotary elements being in spaced, adjacent, non-contacting relationship and the teeth of each of the rotary elements alternating with the teeth of the opposed rotary element, the rotary elements being spaced apart a distance sufficient to pass a strand therebetween whereby one of the teeth on one of the rotary elements exerts pressure on one side of the strand and one of the teeth on the remaining rotary element exerts pressure on the other side of the strand and fractures the strand into granules of generally uniform size,
  means to adjustably support the rotary elements relative to one another,
  a drive means in association with the rotray elements, and
  means to synchronize the rotation of the rotary elements with each other, said means to synchronize including anti-backlash means.

8. The apparatus of claim 7 wherein each of the teeth of the rotary elements terminates in a generally flat surface remote from the axis of rotation, the flat surfaces adapted to engage a strand passing between and generally tangent to the rotary elements.

9. An apparatus for fracturing of strandular brittle material to form a plurality of granules, the apparatus comprising in cooperative combination:
  first and second rotary toothed elements, each of the toothed rotary elements having a plurality of spaced apart teeth externally and longitudinally disposed thereon, the teeth of the first and second rotary elements being in spaced, adjacent, non-contacting relationship, and the teeth of each of the rotary elements alternating with the teeth of the opposed rotary element, the rotary elements being spaced apart a distance sufficient to pass a strand therebetween wherein one of the rotary elements is mounted on a fixed driven shaft, the second rotary element is mounted on an adjustable shaft, a first synchronizing gear is disposed on the fixed shaft, a second synchronizing gear is disposed on the adjustable shaft, two movable idling gears are disposed, one in contact with the first synchronizing gear and one in opposite contact with the second synchronizing gear, the two synchronizing gears being in comparable contact with each other whereby one of the teeth on one of the rotary elements exerts pressure on one side of the strand and one of the teeth on the remaining rotary element exerts pressure on the other side of the strand and fractures the strand into granules of generally uniform size.

10. The apparatus of claim 9 including a braking means in cooperative combination with the adjustable shaft.

11. An apparatus for the preparation of granular plastic material, the apparatus comprising in cooperative combination:
  means to supply a strand of solid synthetic resinous material,
  first and second rotary toothed elements, each of the toothed rotary elements having a plurality of spaced apart teeth externally and longitudinally disposed thereon, the teeth of the first and second rotary elements being in spaced, adjacent, non-contacting relationship and the teeth of each of the rotary elements alternating with the teeth of the opposed rotary element, the rotary elements being spaced apart a distance sufficient to pass a strand therebetween whereby one of the teeth on one of the rotary elements exerts pressure on one side of the strand as two adjacent teeth on the remaining rotary element exert pressure on the other side of the strand thereby fracturing the strand into a plurality of generally uniform sized granules, the teeth of the rotary elements terminating in a generally flat surface remote from the axis of rotation, the flat surfaces adapted to engage a strand passing between and generally tangent to the rotary elements, the rotary elements being adapted to rotate in such a manner as to draw a strand away from the means to supply the strand, and
  means to synchronize rotation of the rotary elements with each other.

12. A method for the preparation of styrene polymer granules from a styrene polymer strand, the method comprising:
  continuously passing at least one strand of a styrene polymer between a pair of spaced apart configurations, the configurations defining a plurality of spaced apart pressure points, the pressure points on opposed configurations being alternately arranged, the pressure points terminating in generally flat surfaces adapted to engage the strand passing therebetween when the strand is generally tangent between the spaced apart configurations,
  applying pressure to locations on opposite sides of the strands by the opposed configurations, the pressure and rate of application of the pressure being sufficient to cause rupture of the strand to form generally uniform sized granules from the strand, the temperature of the styrene polymer being maintained at least 5° C. below the second order transition temperature.

References Cited
UNITED STATES PATENTS

| | | | |
|---|---|---|---|
| 2,101,700 | 12/1937 | Chesnut | 225—103 X |
| 2,305,276 | 12/1942 | Rushmore | 225—104 X |
| 2,419,320 | 4/1947 | Lohrke. | |
| 2,976,578 | 3/1961 | Virgil. | |
| 3,128,507 | 4/1964 | Pearson | 225—97 X |
| 3,317,100 | 2/1967 | Flemming | 225—97 |

JAMES M. MEISTER, Primary Examiner

U.S. Cl. X.R.
225—97, 104